United States Patent
Müller et al.

(10) Patent No.: US 10,167,364 B2
(45) Date of Patent: Jan. 1, 2019

(54) PROCESS FOR PREPARING POLYCARBONATES BY TRANSESTERIFYING DITHIOCARBONATES OR SELENIUM ANALOGUES THEREOF WITH BISPHENOLS

(71) Applicant: Covestro Deutschland AG, Leverkusen (DE)

(72) Inventors: Thomas Ernst Müller, Aachen (DE); Christoph Gürtler, Cologne (DE); Nicolai Kolb, Aachen (DE); Burkhard Köhler, Zierenberg (DE); Walter Leitner, Aachen (DE); Jan Heijl, Lokeren (BE); Alexandra Große Böwing, Dormagen (DE)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 0 days.

(21) Appl. No.: 15/552,219

(22) PCT Filed: Feb. 15, 2016

(86) PCT No.: PCT/EP2016/053113
§ 371 (c)(1),
(2) Date: Aug. 18, 2017

(87) PCT Pub. No.: WO2016/131747
PCT Pub. Date: Aug. 25, 2016

(65) Prior Publication Data
US 2018/0037697 A1   Feb. 8, 2018

(30) Foreign Application Priority Data
Feb. 18, 2015 (EP) .................................. 15155655

(51) Int. Cl.
C08G 64/38 (2006.01)
B01J 27/057 (2006.01)
C08G 64/20 (2006.01)
C08K 5/38 (2006.01)

(52) U.S. Cl.
CPC .......... *C08G 64/38* (2013.01); *B01J 27/0573* (2013.01); *C08G 64/205* (2013.01); *C08K 5/38* (2013.01); *B01J 2219/00051* (2013.01); *B01J 2219/00162* (2013.01)

(58) Field of Classification Search
USPC ......................................................... 528/219
See application file for complete search history.

(56) References Cited

FOREIGN PATENT DOCUMENTS

WO   WO9703104 A1   1/1997

OTHER PUBLICATIONS

International Search Report and Written Opinion for International Application No. PCT/EP2016/053113, European Patent Office, dated Apr. 5, 2016. (German).
International Search Report and Written Opinion for International Application No. PCT/EP2016/053113, European Patent Office, dated Apr. 5, 2016. (English Translation).

*Primary Examiner* — Terressa Boykin
(74) *Attorney, Agent, or Firm* — K&L Gates LLP

(57) ABSTRACT

The present invention relates to a process for preparing aromatic polycarbonates, comprising the step of reacting bisphenols with dithiocarbonates or selenium analogs thereof in the presence of a catalyst. It further relates to the use of dithiocarbonates or selenium analogs thereof as transesterifying reagents for the preparation of polycarbonates.

15 Claims, 1 Drawing Sheet

PROCESS FOR PREPARING POLYCARBONATES BY TRANSESTERIFYING DITHIOCARBONATES OR SELENIUM ANALOGUES THEREOF WITH BISPHENOLS

CROSS-REFERENCE TO RELATED APPLICATIONS

This application is a U.S. national stage application, filed under 35 U.S.C. § 371, of PCT/EP2016/053113, which was filed on Feb. 15, 2016, and which claims priority to European Patent Application No. EP 15155655.2 which was filed on Feb. 18, 2015, the contents of each of which are incorporated by reference into this specification.

FIELD

The present invention relates to a process for preparing aromatic polycarbonates, comprising the step of reacting bisphenols with dithiocarbonates or selenium analogues thereof in the presence of a catalyst. It further relates to the use of dithiocarbonates or selenium analogues thereof as transesterifying reagents for the preparation of polycarbonates.

BACKGROUND

Polycarbonate based on bisphenol A is of great technical and industrial interest. Polycarbonate is usually prepared by phosgenation of bisphenol A by the interfacial process or by catalytic transesterification of diaryl carbonates, particularly diphenyl carbonate, with bisphenol A in the melt.

In the interfacial process, in a multistage reaction, phosgene in at least one solvent is reacted with an aqueous akaline solution of the aromatic diol. The polycarbonate is obtained as a solution in the organic solvent. The workup of the polymer solution includes the recycling of the solvent, giving rise to wastewater streams.

The production of polycarbonate by the melt transesterification process is described, for example, in U.S. Pat. No. 5,399,659 and U.S. Pat. No. 5,340,905. Aromatic polycarbonate is prepared proceeding from aromatic diols, for example bisphenol A, and diaryl carbonates, for example diphenyl carbonate, using various catalysts and using different temperatures and pressures, in order to continuously remove the by-products that arise.

The diaryl carbonate used in the melt transesterification process can be prepared commercially by transesterification of dialkyl carbonate with phenols.

For instance, EP 0 781 760 A1 describes a continuous process for preparing aromatic carbonates by reacting a dialkyl carbonate with an aromatic hydroxyl compound in the presence of a catalyst and continuously removing the diaryl carbonate formed in the reaction, the alcoholic by-products, the dialkyl carbonate and the aromatic hydroxyl compound, with recycling of the dialkyl carbonate and the aromatic hydroxyl compound into the reaction.

WO-A 2004/016577 A1 describes a process for preparing diaryl carbonates from dialkyl carbonate and an aromatic hydroxyl compound in the presence of a catalyst in a plurality of separate and series-connected reaction zones of a reactor arrangement, wherein the heat of condensation obtained in the condensation of the vapour stream of the last reaction zone is used to heat the liquid stream introduced into the first reaction zone. However, a disadvantage of this process is the complicated reactor arrangement. In addition, the energetic integration of this process is in need of improvement and is limited only to the process section of the reaction. Subsequent steps for the workup are not described.

A disadvantage of the direct reaction of dialkyl carbonates with phenols is the tendency for the phenolic OH group to be alkylated by the carbonate. This is the case especially in the reaction of dimethyl carbonate with phenols, such that the corresponding methyl ether is formed. This side reaction is described, inter alia, in *Catal. Commun.* 33 (2013) 20-23. For this reason, dialkyl carbonates are not used directly for polycondensation of bisphenol A to give aromatic polycarbonate, but first reacted with monophenols to give diaryl carbonates. This is accomplished, for example, in the Asahi process, which is described in detail in *Green Chem.* 5 (2003) 497-507.

The production of aliphatic polycarbonates by reacting esters or thioesters of carbonic acid with alkylene glycols is known from WO97/03104 A1.

The problem addressed by the invention was accordingly that of providing an improved process for preparing aromatic polycarbonates, wherein, as compared with the interfacial process, fewer reaction and workup steps are required and wherein the by-products formed in the polycondensation are easier to remove than in the case of reactions described by the prior art.

Accordingly, the problem is solved by a process for preparing polycarbonates, comprising the step of reacting bisphenols with a transesterifying reagent in the presence of a catalyst, wherein the transesterifying reagent comprises a compound of the general formula (I):

$$R-X-C(O)-X'-R' \qquad (I)$$

where
X and X' are each independently S or Se, preferably S, and
R and R' are each independently alkyl or aryl or
R and R' together are an alkylene chain.

The process according to the invention offers the advantage that aromatic polycarbonates are prepared without side reactions, whereas the alkylation of the phenols in the preparation of aromatic polycarbonates by transesterification of aliphatic carbonates is a significant side reaction.

The thiols or selenols that form in the reaction can be removed by distillation from the reaction mixture or the finished product.

The process according to the invention likewise has the advantage that short-chain S,S'-dialkyl dithiocarbonates are liquid at room temperature, whereas diaryl carbonates are solids. The liquid state of matter simplifies the processing of the mixture at the start of the reaction, since phenols can be dissolved in the S,S'-dialkyl dithiocarbonates.

Processes for preparing polycarbonates based on dithiocarbonates are advantageous not just with regard to the preparation of the polycarbonate but also with regard to the preparation of the dithiocarbonate. For instance, dialkyl dithiocarbonates can be prepared analogously to the dialkyl carbonates by phosgenation of the corresponding alkanethiol compound. Likewise known are the synthesis of cyclic dithiocarbonates using catalysts (*Tetrahedron Lett.* 34 (1974) 2899-2900) and the uncatalysed synthesis of linear dithiocarbonates (*Synlett* 10 (2005) 1535-1538) from CO and the corresponding thiols with the aid of selenium. The phosgene-based preparation of dithiocarbonates of the formula (I) is advantageous over the phosgene-based preparation of diaryl carbonates, since the thio compounds have, inter alia, lower melting points, lower molar masses and smaller molar volumes. The phosgene-free preparation of dithiocarbonates of the formula (I) is advantageous over the known phosgene-free preparation of diaryl carbonates since the transesterification step from dialkyl carbonate to diaryl carbonate is dispensed with. In contrast to dialkyl carbonates, dialkyl dithiocarbonates can be used directly in the preparation of polycarbonates without transesterification to the diaryl carbonate.

In the context of the present invention, the term "polycarbonates" includes both oligomeric and polymeric polycarbonate compounds. Polymeric polycarbonates obtained by the process according to the invention preferably have a number-average molecular weight $M_n$ of 18 000 to 80 000 g/mol, more preferably of 19 000 to 50 000 g/mol. The number-average molecular weight can be determined by measurement by means of gel permeation chromatography in THF against polystyrene standards.

SUMMARY

In the general formula I, X and X' are each independently S or Se, preferably S.

BRIEF DESCRIPTION OF THE DRAWINGS

The present invention is elucidated in detail hereinafter with reference to figures and working examples. The figures show.

DETAILED DESCRIPTION

Figure 1:
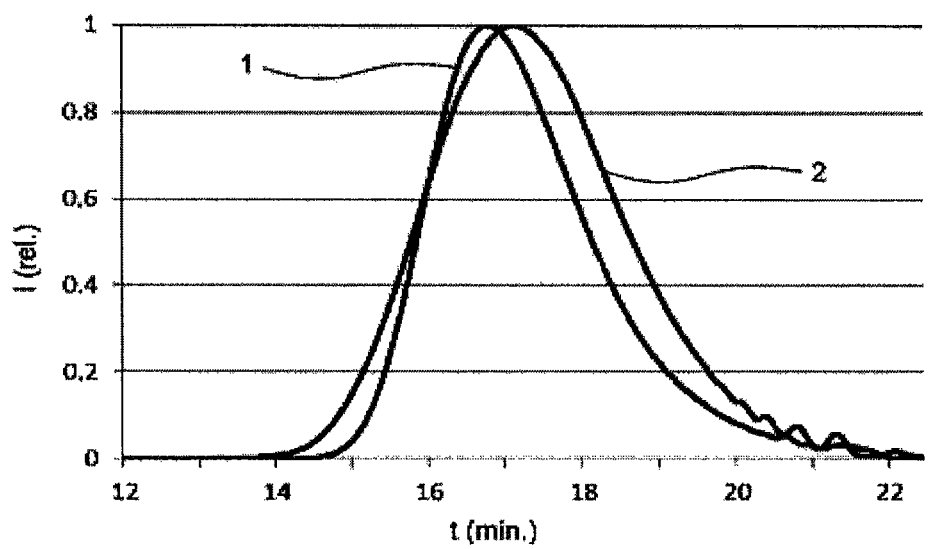
FIG. 1: Shows a gel permeation chromatogram (GPC) of the polycarbonate obtained in comparison with Makrolon.

Examples of suitable compounds of the general formula (I) are those in which R and R' are each independently linear or branched, optionally substituted $C_1$-$C_{34}$-alkyl or optionally substituted $C_5$-$C_{34}$-aryl, preferably $C_1$-$C_6$-alkyl or $C_6$-$C_{10}$-aryl, more preferably $C_1$-alkyl, $C_2$-alkyl or $C_6$-aryl. R and R' may be the same or different. R and R' are preferably the same.

The R and R' radicals together may also be an optionally substituted $C_2$-$C_{12}$-alkylene chain.

$C_1$-Alkyl in the formula (I) is methyl, $C_2$-alkyl is ethyl, and $C_6$-aryl is phenyl.

$C_1$-$C_6$-Alkyl in the formula (I) is additionally, for example, n-propyl, isopropyl, n-butyl, sec-butyl, tert-butyl, n-pentyl, 1-methylbutyl, 2-methylbutyl, 3-methylbutyl, neopentyl, 1-ethylpropyl, cyclohexyl, cyclopentyl, n-hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl or 1-ethyl-2-methylpropyl; $C_1$-$C_{34}$-alkyl is additionally, for example, n-heptyl and n-octyl, pinacyl, adamantyl, the isomeric menthyls, n-nonyl, n-decyl, n-dodecyl, n-tridecyl, n-tetradecyl, n-hexadecyl or n-octadecyl. The same applies to the corresponding alkyl radical, for example in aralkyl or alkylaryl radicals. Alkylene radicals in the corresponding hydroxyalkyl or aralkyl/alkylaryl radicals represent, for example, the alkylene radicals corresponding to the preceding alkyl radicals.

Aryl is a carbocyclic aromatic, optionally heteroatom-substituted radical having 5 to 34 ring atoms. The same applies to the aromatic part of an arylalkyl radical, also known as an aralkyl radical, and also to aryl constituents of more complex groups, for example arylcarbonyl radicals.

Arylalkyl and aralkyl each independently represent a straight-chain, cyclic, branched or unbranched alkyl radical as defined above, which may be mono-, poly- or persubstituted by aryl radicals as defined above.

Particularly preferred compounds of the general formula (I) are dimethyl dithiocarbonate, diethyl dithiocarbonate and diphenyl dithiocarbonate.

Compounds of the formula (I) can be prepared in a corresponding manner to the dialkyl or diaryl carbonates. Known methods for the preparation of dialkyl or diaryl carbonates are, for example, gas phase phosgenation or liquid phase phosgenation under pressure without solvent (EP 2 586 787 A1), interfacial phosgenation, oxidative carbonylation (US 2003 055199 A), carboxylation either directly (WO 2008 044575 A1) or by transesterification of cyclic carbonates (e.g. WO 2007 069529, WO 2008 065874). Suitable catalysts for the preparation of dialkyl and diaryl carbonates are known and can be used for the preparation of the compounds of the formula (I).

According to the invention, the transesterifying reagents according to formula (I), for preparation of polycarbonates, are reacted with bisphenols, preferably of formula (II):

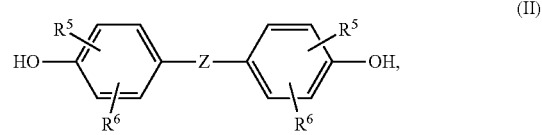

(II)

in which $R^5$ and $R^6$ each independently represent H, $C_1$-$C_{18}$-alkyl, $C_1$-$C_{18}$-alcoxy, halogen such as Cl or Br or aryl or aralkyl which each may be optionally substituted, preferably H or $C_1$-$C_{12}$-alkyl, more preferably H or $C_1$-$C_8$-alkyl and most preferably H or methyl and Z represents a single bond, —$SO_2$—, —CO—, —O—, —S—, $C_1$-$C_6$-alkylene, $C_2$-$C_5$-alkylidene or $C_6$-$C_{12}$-arylene, which can be condensed with other aromatic rings optionally containing heteroatoms.

Examples of such compounds which can be used in the process according to the invention are dihydroxydiarylalkanes such as hydroquinone, resorcinol, dihydroxydiphenyl, bis(hydroxyphenyl)alkanes, bis(hydroxyphenyl)cycloalkanes, bis(hydroxyphenyl) sulphides, bis(hydroxyphenyl) ethers, bis(hydroxyphenyl) ketones, bis(hydroxyphenyl) sulphones, bis(hydroxyphenyl) sulphoxides, α,α'-bis(hydroxyphenyl)diisopropylbenzenes, and the alkylated, ring-alkylated and ring-halogenated compounds thereof.

Examples of bisphenols are 4,4'-dihydroxydiphenyl, 2,2-bis(4-hydroxyphenyl)-1-phenylpropane, 1,1-bis(4-hydroxyphenyl)phenylethane, 2,2-bis(4-hydroxyphenyl)methane (bisphenol F), 2,2-bis(4-hydroxyphenyl)propane (bisphenol A (BPA)), 2,4-bis(4-hydroxyphenyl)-2-methylbutane, 1,3-bis[2-(4-hydroxyphenyl)-2-propyl]benzene (bisphenol M), 2,2-bis(3-methyl-4-hydroxyphenyl)propane, bis(3,5-dimethyl-4-hydroxyphenyl)methane, 2,2-bis(3,5-dimethyl-4- hydroxyphenyl)propane, bis(3,5-dimethyl-4-hydroxyphenyl) sulphone, 2,4-bis(3,5-dimethyl-4-hydroxyphenyl)-2-methylbutane, 1,3-bis[2-(3,5-dimethyl-4-hydroxyphenyl)-2-propyl]benzene, 1,1-bis(4-hydroxyphenyl)cyclohexane and 1,1-bis(4-hydroxyphenyl)-3,3,5-trimethylcyclohexane (bisphenol TMC).

Particularly preferred bisphenols are 4,4'-dihydroxydiphenyl, 1,1-bis(4-hydroxyphenyl)phenylethane, 2,2-bis(4-hydroxyphenyl)methane (bisphenol F), 2,2-bis(4-hydroxyphenyl)propane (bisphenol A (BPA)), 2,2-bis(3,5-dimethyl-4-hydroxyphenyl)propane, 1,1-bis(4-hydroxyphenyl)cyclohexane and 1,1-bis(4-hydroxyphenyl)-3,3,5-trimethylcyclohexane (bisphenol TMC).

Suitable bisphenols are also described in U.S. Pat. No. 2,999,835 A, U.S. Pat. No. 3,148,172 A, U.S. Pat. No. 2,991,273 A, U.S. Pat. No. 3,271,367 A, U.S. Pat. No. 4,982,014 A and U.S. Pat. No. 2,999,846 A, in German published specifications DE 15 70 703 A, DE 20 63 050 A, DE 2036 052 A, DE 22 11 956 A and DE 38 32 396 A, French patent FR 1 561 518 A, in the monograph by H. Schnell, Chemistry and Physics of Polycarbonates, Interscience Publishers, New York 1964, p. 28ff; p. 102ff, and by D. G. Legrand, J. T. Bendler, Handbook of Polycarbonate Science and Technology, Marcel Dekker New York 2000, p. 72ff.

Preferably, the compound of the formula (I) and the bisphenol are used in the process according to the invention in a molar ratio of at least 1:1, more preferably 1:1 to 2:1.

Examples of suitable catalysts are inorganic or organic basic compounds, for example lithium salts, sodium salts, potassium salts, caesium salts, calcium salts, barium salts and magnesium salts selected from the group of the hydroxides, carbonates, halides, phenoxides, diphenoxides, fluorides, acetates, phosphates, hydrogenphosphates and boranates, and additionally nitrogen and phosphorus bases, for example tetramethylammonium hydroxide, tetramethylammonium acetate, tetramethylammonium fluoride, tetramethylammonium tetraphenylboranate, tetraphenylphosphonium fluoride, tetraphenylphosphonium tetraphenylboranate, dimethyldiphenylammonium hydroxide, tetraethylammonium hydroxide, 1,8-diazabicyclo[5.4.0]undec-7-ene (DBU), 1,5-diazabicyclo[4.3.0]non-5-ene (DBN), and guanidine systems, for example 1,5,7-triazabicyclo[4.4.0]dec-5-ene, 7-phenyl-1,5,7-triazabicyclo[4.4.0]dec-5-ene, 7-methyl-1,5,7-triazabicyclo[4.4.0]dec-5-ene, 7,7'-hexylidenedi-1,5,7-triazabicyclo[4.4.0]dec-5-ene, 7,7'-decylidenedi-1,5,7-triazabicyclo[4.4.0]dec-5-ene, 7,7'-dodecylidenedi-1,5,7-triazabicyclo[4.4.0]dec-5-ene, and phosphazenes, for example tert-octyliminotris(dimethylamino)phosphorane (phosphazene base Pl-t-oct), tert-butyliminotris(dimethylamino)phosphorane (phosphazene base Pl-t-butyl) and 2-tert-butylimino-2-diethylamino-1,3-dimethylperhydro-1,3,2-diaza-2-phosphorane (BEMP), and phosphorus-containing cage molecules such as trialkylprophosphatranes, for example trimethyl-, triethyl-, triisobutyl-, tribenzyl- or tri-4-methoxybenzylprophosphatrane, and proton sponges such as 1,8-bis(dimethylamino)naphthalene or 1,8-bis(hexamethyltriaminophosphazenyl)naphthalene.

These catalysts are preferably used in amounts of 1 to $10^{-8}$ mol, based on 1 mol of bisphenol.

The catalyst may also be used in a combination of two or more catalysts.

On completion of the reaction, the catalysts may be left in the product, or removed, neutralized or masked. Preferably, the catalyst is or the catalysts are left in the product.

The aromatic polycarbonates obtainable by the process according to the invention may be branched in a controlled manner through the use of small amounts of branching agent. Suitable branching agents are: phloroglucinol, 4,6-dimethyl-2,4,6-tri(4-hydroxyphenyl)heptane, 1,3,5-tri(4-hydroxyphenyl)benzene, 1,1,1-tri(4-hydroxyphenyl)ethane, tri(4-hydroxyphenyl)phenylmethane, 2,2-bis[4,4-bis(4-hydroxyphenyl)cyclohexyl]propane, 2,4-bis(4-hydroxyphenylisopropyl)phenol, 2,6-bis(2-hydroxy-5'-methylbenzyl)-4-methylphenol, 2-(4-hydroxyphenyl)-2-(2,4-dihydroxy-phenyl)propane, hexa(4-(4-hydroxyphenylisopropyl)phenyl) orthoterephthalate, tetra(4-hydroxyphenyl)methane, tetra(4-(4-hydroxyphenylisopropyl)phenoxy)methane, isatin biscresol, pentaerythritol, 2,4-dihydroxybenzoic acid, trimesic acid, cyanuric acid, 1,4-bis(4',4''-dihydroxytriphenyl)methyl)benzene and α,α',α''-tris(4-hydroxyphenyl)-1,3,4-triisopropenyl-benzene. Particular preference is given to 1,1,1-tri(4-hydroxyphenyl)ethane (THPE) and isatin biscresol (TBK).

These branching agents can be added at any desired stage in the process. The addition can be effected, for example, in a first stage in the preparation of low molecular weight polycarbonates. The addition can likewise be effected in a second stage in the melt transesterification of low molecular weight polycarbonates to give high molecular weight polycarbonates.

The polycarbonates obtained in accordance with the invention may contain chain terminators. Corresponding chain terminators are known, inter alia, from EP 335 214 A and DE 3 007 934 A. Examples of chain terminators are monophenols such as phenol, alkylphenols such as cresols, p-tert-butylphenol, p-n-octylphenol, p-isooctylphenol, p-n-nonylphenol and p-isononylphenol, halophenols such as p-chlorophenol, 2,4-dichlorophenol, p-bromophenol and 2,4,6-tribromophenol, and also p-cumylphenol. Particular preference is given to phenol and p-cumylphenol.

Embodiments and further aspect of the present invention are outlined hereinafter. They can be combined with one another as desired, unless the opposite is clear from the context.

In a preferred embodiment of the process according to the invention, the thiols and/or selenols formed during the reaction are removed continuously. Especially in the case of use of S,S'-dimethyl dithiocarbonate and/or S,S'-diethyl dithiocarbonate, where the reaction give rises to methanethiol and ethanethiol respectively, the removal can be effected by distillative removal of the gaseous thiol. It is likewise possible in the case of use of S,S'-diphenyl dithiocarbonate, where the reaction gives rise to thiophenol, to effect the removal by distillative removal of the thiophenol.

In a further embodiment of the process according to the invention, the reaction is conducted for a first period of time at a first temperature and a first pressure and then for a second period of time at a second temperature and a second pressure, where the second temperature is additionally greater than the first temperature and the second pressure lower than the first pressure.

Without being bound to a theory, it is assumed that, in a first step of the reaction, predominantly low molecular weight polycarbonates are formed and, in a second step, these low molecular weight polycarbonates condense to form a high molecular weight polycarbonate. The increase in the temperature and the reduction in the pressure in the second stage of the reaction may independently be effected once, in several steps or in a graduated manner. What is included is especially a multistage process in which the reaction is conducted for at least one further period of time at a further temperature and a further pressure, etc. Preferably, the temperature in this further process step is greater than the first two temperatures and the pressure is lower than the first two pressures.

Preferably, the first temperature is 150° C. to 210° C. and the second temperature is 210° C. to 400° C. More preferably, the first temperature is 175° C. to 205° C. Independently of this, a second temperature of 250° C. to 350° C. is preferred.

It is likewise preferable that the first pressure is 200 mbar to 900 mbar and the second pressure is 1 mbar to 200 mbar. More preferably, the first pressure is 250 mbar to 600 mbar. Independently of this, a second pressure of ≤10 mbar is preferred.

For example, the polycarbonate synthesis can be conducted by transesterifying a dithiocarbonate with a bisphenol in the melt as follows: in the first stage, the melting of the bisphenol and the catalyst with the dithiocarbonate takes place at a temperature of 170 to 210° C. under a reduced pressure of 900 to 200 mbar, preferably 600 to 400 mbar, within 0.01 to 3 hours, forming low molecular weight oligomers. In the second stage of the reaction, the preparation of the high molecular weight polycarbonate is conducted at temperatures of 210 to 400° C., preferably 250 to 350° C., and reduced pressures of not more than 10 mbar within 0.01 to 5 hours.

The process according to the invention can be conducted batchwise or continuously, for example in stirred tanks, thin-film evaporators, falling-film evaporators, stirred tank cascades, extruders, kneaders, simple disc reactors or high-viscosity disc reactors. The process is preferably conducted continuously.

It is likewise possible that the reaction conducted for the second period of time at the second temperature and the second pressure is conducted in an evaporating extruder, a disc reactor or an evaporating calender.

In a further embodiment of the process according to the invention, the bisphenol used is bisphenol A, bisphenol F and/or bisphenol TMC.

In a further embodiment of the process according to the invention, R and R' in the general formula (I) are methyl, ethyl or phenyl. Particular preference is given to dimethyl dithiocarbonate.

In a further embodiment of the process according to the invention, the compound of the general formula (I) is a dialkyl dithiocarbonate, preferably dimethyl dithiocarbonate or diethyl dithiocarbonate.

In a further embodiment of the process according to the invention, the catalyst is a phosphonium salt or a bicyclic amine.

Preferred phosphonium salts are those of the general formula (III)

$$\left[ \begin{array}{c} R_1 \\ | \\ R_4 - P - R_2 \\ | \\ R_3 \end{array} \right]^+ X^-$$
(III)

where $R_1$, $R_2$, $R_3$ and $R_4$ may each independently be the same or different $C_1$- to $C_{18}$-alkylenes, $C_6$ to $C_{10}$-aryls or $C_5$ to $C_6$-cycloalkyls and $X^-$ may be an anion, in which the corresponding acid-base pair $H^+ + X^- \rightarrow HX$ has a $pK_b$ of <11.

Particularly preferred phosphorium salts are tetraphenylphosphonium fluoride, tetraphenylphosphonium tetraphenylborate and tetraphenylphosphonium phenoxide, especially tetraphenylphosphonium phenoxide.

Particularly preferred catalysts are tetraphenylphosphonium phenoxide and DBU.

In a further embodiment of the process according to the invention, the catalyst is added in two or more portions over the course of the reaction. For example, the catalyst can be added in three equal portions.

In a further embodiment of the process according to the invention, it further comprises the step of adding a diaryl carbonate or dialkyl carbonate to the reaction product obtained. In an alternative embodiment, the diaryl carbonate or dialkyl carbonate is added at the start or during the reaction of the compound of the formula (I) with the bisphenol. In this way, the molecular weight of the polycarbonates obtained beforehand can be increased further. In addition, the content of thioester and OH groups in the polycarbonate is reduced. Preferably, the diaryl carbonate used is diphenyl carbonate (DPC). The amount of the diaryl carbonate or dialkyl carbonate may, for example, be 5 mol % to 15 mol %, based on the amount of bisphenol originally used.

The invention likewise relates to the use of a compound of the general formula (I):

R—X—C(O)—X'—R'      (I)

where

X and X' are S or Se, preferably S, and

R and R' are each independently alkyl or aryl or

R and R' together are an alkylene chain, as transesterifying reagent for the preparation of polycarbonates. With regard to the definitions of R and R', reference is made to the above remarks in connection with the process according to the invention. Preference is given to using S,S'-dialkyl dithiocarbonates, especially S,S'-dimethyl dithiocarbonate or S,S'-diethyl dithiocarbonate, or S,S'-diaryl dithiocarbonates, especially S,S'-diphenyl dithiocarbonate, as transesterifying reagents.

EXAMPLES

The present invention is illustrated in detail by the examples and comparative examples which follow, but without being restricted thereto.

Transesterifying reagents used:

Dimethyl dithiocarbonate S,S'-dimethyl dithiocarbonate

Dimethyl carbonate O,O'-dimethyl carbonate

Bisphenols used:

Bisphenol A 2,2-bis(4-hydroxyphenyl)propane

Polycarbonates used as reference substance:

Makrolon Aromatic homopolycarbonate based on bisphenol A from Bayer MaterialScience AG having a number-average molecular weight of $M_n$=13 900 g/mol and a polydispersity of 2.4.

The polymerization reaction of bisphenol A with dimethyl dithiocarbonate gives a linear polycarbonate which, as possible end groups, contains the free OH groups shown in the formula (Xa)

(Xa)

[structure: H—[O—C(O)—O—C6H4—C(CH3)2—C6H4—]n—OH]

and/or the unsymmetric thioesters shown in formula (Xb)

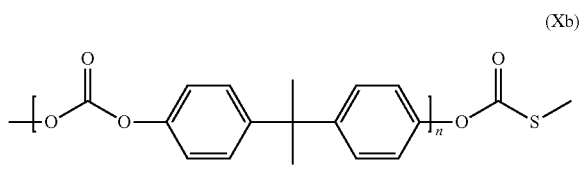
(Xb)

and/or the alkylated phenol groups shown in formula (Xc)

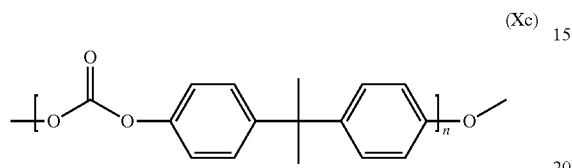
(Xc)

In the case of addition of diphenyl carbonate (cf. Example 3), what is obtained is a polycarbonate containing, as possible end groups, additionally or exclusively the monofunctional phenol groups shown in formula (Xd)

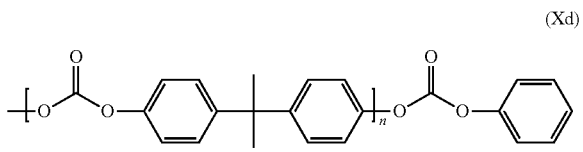
(Xd)

The linear polymeric molecules usually contain two end groups of the formulae (Xa) to (Xd), where each molecule may contain two identical or two different end groups.

Each sample was dissolved in deuterated chloroform and analysed on a Bruker spectrometer (AV400, 400 MHz). The degree of functionalization of the bisphenol A was determined by means of $^1$H NMR spectroscopy. For this purpose, the intensities of the different resonances were integrated with respect to one another.

The relevant resonances in the $^1$H NMR spectrum (based on TMS=0 ppm) which were used for integration are as follows:
I1: 1.59: $CH_3$ groups of the repeat bisphenol A units
I2: 2.32: $CH_3$ group of the unsymmetric thioester (Xb)
I3: 3.69: $CH_3$ group of the alkylated phenol (Xc)
I4: 6.57-6.60 and 6.96-6.99: aromatic CH groups on bisphenol A and phenyl rings of terminal bisphenol A units with directly bonded free OH groups (Xa)
I5: 7.07-7.09 and 7.16-7.18: aromatic CH groups of bisphenol A-based repeat units and phenyl rings of terminal bisphenol A units without directly bonded free OH groups (Xa)

The figure for the degree of functionalization of the bisphenol A unit is based on the proportion of phenol groups converted in the bisphenol A used and is given in mol %. Taking account of the relative intensities, the values were calculated as follows:

Degree of functionalization=$I5/(I4+I5)$

The number-average molecular weight $M_n$ and the weight-average molecular weight $M_w$ of the resulting polymers were determined by means of gel permeation chromatography (GPC). The procedure of DIN 55672-1 was followed: "Gel permeation chromatography, Part 1—Tetrahydrofuran as eluent" (SECurity GPC System from PSS Polymer Service, flow rate 1.0 ml/min; columns: 2×PSS SDV linear M, 8×300 mm, 5 μm; RID detector). Polystyrene samples of known molar mass were used for calibration.

The reaction of bisphenol with a transesterifying reagent was conducted in a Schlenk tube with attached reflux condenser. The Schlenk tube was heated externally with an electrical heating mantle which was kept at the temperature specified by closed-loop control. The reaction mixture was stirred by means of a magnetic stirrer bar within the reaction mixture.

Example 1: Reaction of Bisphenol a with Dimethyl Dithiocarbonate in a One-Stage Process To bisphenol A (5.71 g, 25.0 mmol) in a 100 ml Schlenk tube with attached reflux condenser were added dimethyl dithiocarbonate (3.05 g, 25.0 mmol) and tetraphenylphosphonium phenoxide (216 mg, 2.0 mol % based on carbonate used). Subsequently, the reaction mixture was heated with an electrical heating mantle to 200° C. at a pressure of 750 mbar for 6 hours.

6.62 g of a viscous material were obtained.
$^1$H NMR analysis in the region of the aromatic hydrogens (5.5-8.5 ppm) showed 75% functionalization of the bisphenol A.

GPC analysis of the product gave a number-average molecular weight of $M_n$=570 g/mol and a polydispersity of 3.53.

Example 2: Reaction of Bisphenol A with Dimethyl Dithiocarbonate in a Two-Stage Process To bisphenol A (5.71 g, 25.0 mmol) in a 100 ml Schlenk tube with attached reflux condenser were added dimethyl dithiocarbonate (4.88 g, 40.0 mmol) and tetraphenylphosphonium phenoxide (85 mg, 2.0 mol % based on carbonate used). Subsequently, the reaction mixture was heated in two stages. First, the mixture was heated to 250° C. under reflux at a pressure of 500 mbar for one hour. Subsequently, the reflux condenser was exchanged for a distillation system. The reaction mixture was still heated to 250° C., in the course of which an argon stream was first passed through the reaction mixture for one hour and then the pressure was reduced to 10 mbar for 30 minutes. Subsequently, the vessel was closed and the reaction mixture was heated to 300° C. at a pressure of <1 mbar for 2 hours. In the course of this, a brownish precipitate sublimed on the upper walls of the vessel. No yield was determined.

$^1$H NMR analysis in the region of the aromatic hydrogens (5.5-8.5 ppm) showed complete functionalization of the bisphenol A.

GPC analysis of the product gave a number-average molecular weight of $M_n$=1700 g/mol and a polydispersity of 1.94.

Example 3: Reaction of Bisphenol A with Dimethyl Dithiocarbonate in a Two-Stage Process and Addition of Diphenyl Carbonate to Reduce the Content of Thioester and OH Groups in the Product Polymerization To bisphenol A (5.71 g, 25.0 mmol) in a 100 ml Schlenk tube with attached reflux condenser were added dimethyl dithiocarbonate (4.27 g, 35.0 mmol) and tetraphenylphosphonium phenoxide (76 mg, 0.5 mol % based on carbonate used). Subsequently, the reaction mixture was heated in stages. First, the mixture was heated to 220° C. under reflux at a pressure of 400 mbar for one hour. Subsequently, the reflux condenser was exchanged for a distillation system. The reaction mixture was heated at a pressure of 10 mbar for one hour, with stepwise increases in temperature after 20 minutes in each case from 220° C. to 260° C. and then 300° C.

Addition of Diaryl Carbonate or Dialkyl Carbonate

Then diphenyl carbonate was added (DPC, 428 mg, 2 mmol). Subsequently, the vessel was closed and the reaction mixture was heated to 300° C. under a pressure of <1 mbar for 1 hour.

$^1$H NMR analysis in the region of the aromatic hydrogens (5.5-8.5 ppm) showed 85% functionalization of the bisphenol A after the first reaction step. The $^1$H NMR analysis of the product corresponded to Makrolon in all aspects.

GPC analysis of the product gave a number-average molecular weight of $M_n$=11 300 g/mol and a polydispersity of 4.340.

5.62 g of polycarbonate were obtained (87.8% yield).

Example 4 (Comparative Example): Reaction of Bisphenol A with Dimethyl Carbonate To bisphenol A (5.71 g, 25.0 mmol) in a 100 ml Schlenk tube with attached reflux condenser were added dimethyl carbonate (3.15 g, 35.0 mmol) and tetraphenylphosphonium phenoxide (76 mg, 0.5 mol % based on carbonate used). Subsequently, the reaction mixture was heated at a pressure of 400 mbar. Strong reflux was observed; there was likewise formation of a white solid in the flask. The temperature of the reaction mixture rose to a maximum temperature of 73° C. within one hour.

Analysis of the product mixture by $^1$H NMR in the range of the aromatic hydrogens (5.5-8.5 ppm) showed that the reaction mixture contained mainly (>60%) unconverted bisphenol A as well as unconverted dimethyl carbonate.

TABLE 1

Comparison of the results of Inventive Examples 1-3 with Comparative Example 4

| Example | Process | Degree of functionalization of bisphenol A [%] | Molecular weight of the product obtained [g/mol] | Poly-dispersity |
|---|---|---|---|---|
| 1 | one-stage | 75 | 570 | 3.53 |
| 2 | two-stage | 100 | 1700 | 1.94 |
| 3 | two-stage | 100 | 11 300 | 4.34 |
| 4 (comp.) | one-stage | 40 | — | — |

Comparison of Examples 1 to 3 with Comparative Example 4 shows that use of a dichalcogenide carbonate as transesterifying reagent affords an oligomeric polycarbonate (Example 1) or polymeric polycarbonate (Examples 2 and 3), whereas, in the case of use of dimethyl carbonate as transesterifying reagent (Comparative Example 4), bisphenol A is reacted with dimethyl carbonate only in a low yield and no polycarbonate is obtained.

Example 5: Reaction of Bisphenol A with Dimethyl Dithiocarbonate in a Two-Stage Process To bisphenol A (5.71 g, 25.0 mmol) in a 100 ml Schlenk tube with attached reflux condenser were added dimethyl dithiocarbonate (4.88 g, 40.0 mmol) and tetraphenylphosphonium phenoxide (85 mg, 0.5 mol % based on carbonate used). Subsequently, the reaction mixture was heated in stages. First, the mixture was heated to 220° C. under reflux at a pressure of 400 mbar for one hour. Subsequently, the reflux condenser was exchanged for a distillation system. The reaction mixture was heated at a pressure of 10 mbar for one hour, with stepwise increases in temperature after 20 minutes in each case from 220° C. to 260° C. and then 300° C. Subsequently, the vessel was closed and the reaction mixture was heated to 300° C. at a pressure of <1 mbar for 1 hour.

5.85 g of polycarbonate were obtained (91.4% yield).

GPC analysis of the product gave a number-average molecular weight of $M_n$=10 000 g/mol and a polydispersity of 2.92.

$^1$H NMR analysis in the region of the aromatic hydrogens (5.5-8.5 ppm) showed 90% functionalization of the bisphenol A after the first reaction step. The $^1$H NMR analysis of the product corresponded to Makrolon in all significant aspects.

A gel permeation chromatogram (GPC) of the polycarbonate obtained in comparison with Makrolon is shown in FIG. 1. Curve 1 is for Makrolon, curve 2 for the polymer sample according to the invention.

Example 6: Reaction of Bisphenol A with Dimethyl Dithiocarbonate in a Two-Stage Process To bisphenol A (5.71 g, 25.0 mmol) in a 100 ml Schlenk tube with attached reflux condenser were added dimethyl dithiocarbonate (4.88 g, 40.0 mmol) and 1,8-diazabicyclo [5.4.0]undec-7-ene (DBU, 60 mg, 1.0 mol % based on carbonate used). Subsequently, the reaction mixture was heated in stages. First, the mixture was heated to 250° C. under reflux at a pressure of 500 mbar for one hour. Subsequently, the reflux condenser was exchanged for a distillation system. The reaction mixture was heated at a pressure of 10 mbar for one hour, in the course of which the reaction mixture was first heated to 250° C. for half an hour and then to 300° C. for a further half hour. Subsequently, the vessel was closed and the reaction mixture was heated to 300° C. at a pressure of <1 mbar for 1 hour.

6.31 g of polycarbonate were obtained (98.6% yield).

GPC analysis of the product gave a number-average molecular weight of $M_n$=3700 g/mol and a polydispersity of 2.37.

$^1$H NMR analysis in the region of the aromatic hydrogens (5.5-8.5 ppm) showed 90% functionalization of the bisphenol A after the first reaction step. The $^1$H NMR analysis of the product corresponded to Makrolon in all significant aspects.

Comparison

| Example | Catalyst | Amount of catalyst used [mol %]* | Degree of functionalization of bisphenol A [%] | Molecular weight of the product obtained [g/mol] | Poly-dispersity |
|---|---|---|---|---|---|
| 3 | tetraphenyl-phosphonium phenoxide | 2.0 | 100 | 11 300 | 4.34 |
| 5 | tetraphenyl-phosphonium phenoxide | 0.5 | >95 | 10 000 | 2.92 |
| 6 | DBU | 1.0 | ~95 | 3700 | 2.37 |

*mol % based on carbonate

A comparison of Examples 3, 5 and 6 shows that, for the reaction of the dichalcogenide carbonate with bisphenol A, it is possible to use tetraarylphosphonium arylates (Examples 3 and 5) and bicyclic amine compounds (Example 6) as catalyst.

Example 7: Reaction of Bisphenol A with Dimethyl Dithiocarbonate in a Two-Stage Process To bisphenol A (5.71 g, 25.0 mmol) in a 100 ml Schlenk tube with attached reflux condenser were added dimethyl dithiocarbonate (4.88 g, 40.0 mmol) and tetraphenylphosphonium phenoxide (85 mg, 0.5 mol % based on carbonate used). Subsequently, the reaction mixture was heated in stages. First, the mixture was heated to 200° C. under reflux at a pressure of 750 mbar for one hour. Subsequently, the reflux condenser was exchanged for a distillation system. The reaction mixture was heated at a pressure of 10 mbar for one hour, in the course of which the temperature was kept at 200° C. for 30 minutes and then increased stepwise to 250° C. and then 300° C. for 15 minutes in each case. Subsequently, the vessel was closed and the reaction mixture was heated to 300° C. at a pressure of <1 mbar for 1 hour.

5.56 g of polycarbonate were obtained (86.9% yield).

GPC analysis of the product gave a number-average molecular weight of $M_n$=6500 g/mol and a polydispersity of 2.48.

$^1$H NMR analysis in the region of the aromatic hydrogens (5.5-8.5 ppm) showed 80% functionalization of the bisphenol A after the first reaction step. The $^1$H NMR analysis of the product corresponded to Makrolon in all significant aspects.

Comparison

| Example | 1st stage | 2nd stage | 3rd stage | Molecular weight of the product obtained [g/mol] | Poly-dispersity |
|---|---|---|---|---|---|
| 5 | 400 mbar, 220° C. | 10 mbar, 220 → 300° C. | <1 mbar, 300° C. | 10 000 | 2.92 |
| 7 | 750 mbar, 200° C. | 10 mbar, 200 → 300° C. | <1 mbar, 300° C. | 6500 | 2.48 |

A comparison of Examples 5 and 7 shows that it is possible to use different temperatures and pressure levels for the reaction of the dichalcogenide carbonate with bisphenol A.

Figure 2:
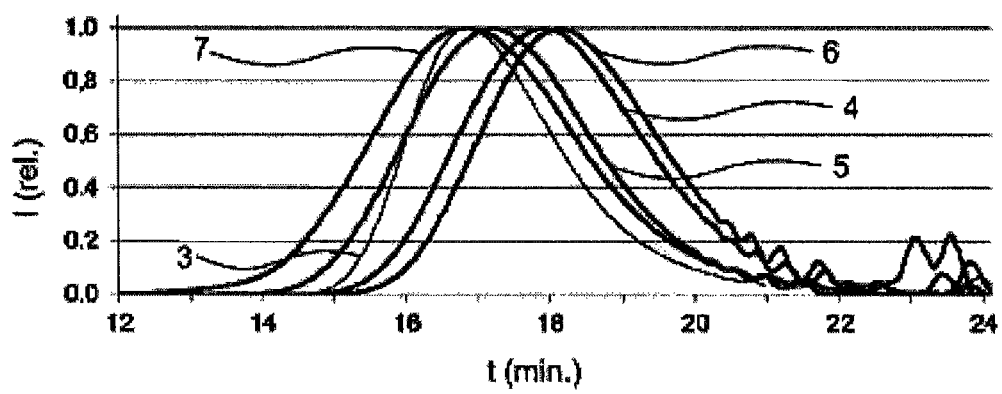
FIG. 2: Shows a comparison of the gel permeation chromatograms of Makrolon (curve 3) and the reaction product obtained from a polymerization of bisphenol A with dimethyl dithiocarbonate without addition of DPC (Example 5) after various reaction times (curve 4: 2 hours, curve 5: 3 hours) and the reaction product obtained from a reaction with addition of DPC (Example 3) after a reaction time of 2 hours at various reaction times (curve 6: 2 hours, immediately prior to addition of DPC; curve 7: 3 hours, after complete polymerization).

FIG. 2 shows a comparison of the gel permeation chromatograms of Makrolon (curve 3) and the reaction product obtained from a polymerization of bisphenol A with dimethyl dithiocarbonate without addition of DPC (Example 5) after various reaction times (curve 4: 2 hours, curve 5: 3 hours) and the reaction product obtained from a reaction with addition of DPC (Example 3) after a reaction time of 2 hours at various reaction times (curve 6: 2 hours, immediately prior to addition of DPC; curve 7: 3 hours, after complete polymerization). The increase in the molecular weight as a result of the DPC addition is clearly apparent.

The invention claimed is:

1. A process for preparing polycarbonates, comprising reacting bisphenols with a transesterifying reagent in the presence of a catalyst, wherein the transesterifying reagent comprises a compound of the general formula (I):

R—X—C(O)—X'—R'  (I)

wherein

X and X' are each independently S or Se, and

R and R' are each independently alkyl or aryl or

R and R' together are an alkylene chain.

2. The process according to claim 1, wherein X and X' in the general formula (I) are S.

3. The process according to claim 1, wherein the compounds R—X—H and R'—X'—H formed during the reaction are removed continuously.

4. The process according to claim 1, wherein the reaction is conducted for a first period of time at a first temperature and a first pressure and then for a second period of time at a second temperature and a second pressure, and wherein the second temperature is greater than the first temperature and the second pressure is lower than the first pressure.

5. The process according to claim 4, wherein the first temperature is 150° C. to 210° C. and the second temperature is 210° C. to 400° C.

6. The process according to claim 4, wherein the first pressure is 200 mbar to 900 mbar and the second pressure is 1 mbar to 200 mbar.

7. The process according to claim 4, wherein the reaction conducted for the second period of time at the second temperature and the second pressure is conducted in an evaporating extruder, a disc reactor or an evaporating calender.

8. The process according to claim 1, wherein R and R' in the general formula (I) are methyl, ethyl or phenyl.

9. The process according to claim 1, wherein the transesterifying reagent is a dialkyl dithiocarbonate.

10. The process according to claim 1, wherein the polyols used include bisphenol A, bisphenol F, or bisphenol TMC.

11. The process according to claim 1, wherein the catalyst is a phosphonium salt or a bicyclic amine.

12. The process according to claim 1, wherein the catalyst is added in two or more portions over the course of the reaction.

13. The process according to claim 1, further comprising adding a diaryl carbonate or dialkyl carbonate to the reaction product obtained.

14. A transesterifying reagent for the preparation of polycarbonates comprising a compound of the general formula (I):

(I), wherein
X and X' are S or Se, and
R and R' are each independently alkyl or aryl or
R and R' together are an alkylene chain.

15. The process according to claim 5, wherein the first pressure is 200 mbar to 900 mbar and the second pressure is 1 mbar to 200 mbar.

* * * * *